United States Patent [19]
Brown

[11] 4,249,452
[45] Feb. 10, 1981

[54] HYDRAULIC BRAKE BOOSTER RESERVE SYSTEM

[75] Inventor: Arthur K. Brown, South Bend, Ind.

[73] Assignee: The Bendix Corporation, Southfield, Mich.

[21] Appl. No.: 39,429

[22] Filed: May 15, 1979

Related U.S. Application Data

[63] Continuation of Ser. No. 871,571, Jan. 23, 1978, abandoned, which is a continuation of Ser. No. 722,956, Sep. 13, 1976, abandoned.

[51] Int. Cl.³ .............................................. F01B 25/02
[52] U.S. Cl. ....................................... 91/6; 60/547 B; 60/582; 92/81; 92/142
[58] Field of Search ............... 60/548, 582, 585, 589, 60/593, 413, 418, 547 R, 547 B, 404; 91/5, 6; 92/81, 142

[56] References Cited

U.S. PATENT DOCUMENTS

| | | | |
|---|---|---|---|
| 3,069,858 | 12/1962 | Elliott | 60/582 |
| 3,134,398 | 5/1964 | Reynolds | 92/81 |
| 3,363,513 | 1/1968 | Ottestad | 138/31 |
| 3,447,421 | 6/1969 | Pelouch | 92/81 |
| 3,677,007 | 7/1972 | Goscenski | 60/582 |
| 4,075,848 | 2/1978 | Veda | 60/582 |

FOREIGN PATENT DOCUMENTS 2507588 8/1975 Fed. Rep. of Germany ............. 60/582

*Primary Examiner*—Abraham Hershkovitz
*Attorney, Agent, or Firm*—Paul David Schoenle; Ken C. Decker

[57] ABSTRACT

A hydraulic brake booster provides a housing within which a spool valve is slidably mounted. The housing forms a pressure chamber and the spool valve is movable from a first position venting the pressure chamber to a second position, communicating the pressure chamber to a fluid pressure source as the spool valve moves toward the second position. A piston or cylindrical accumulator is also slidably mounted in the housing and moves in response to pressurized fluid in the pressure chamber to actuate braking. In order to hydraulically actuate braking when the pressure source is disabled, the piston includes a storage chamber within which pressurized fluid from the pressure chamber is stored. With the source disabled an operator actuating means moves the spool valve to the second position to close the pressure chamber to the pressure source. Further movement of the operator actuating means actuates a check valve to open the storage chamber to the pressure chamber so that pressurized fluid is communicated to the pressure chamber to move the piston for actuating braking.

6 Claims, 2 Drawing Figures

4,249,452

HYDRAULIC BRAKE BOOSTER RESERVE SYSTEM

This is a continuation, of application Ser. No. 871,571, filed Jan. 23, 1978, now abandoned, which is a continuation of Ser. No. 722,956, fild on Sept. 13, 1976 and now abandoned.

BACKGROUND OF THE INVENTION

It is known in prior art brake booster to provide an accumulator to a hydraulic brake booster so that when the power source fails stored pressurized fluid in the accumulator is available to assist in actuating braking. For example, if the fan belt on a motor vehicle breaks, the power steering pump is disabled so that no source of fluid pressure is available to actuate braking unless a secondary pressure source is provided. Consequently, prior art brake boosters provide an accumulator which is communicated with the brake booster pressure chamber when the pressure source is disabled to actuate braking.

In view of the decreasing size of most motor vehicles in order to compensate for fuel consumption, engine compartments are also diminishing. With less space for mounting a hydraulic brake booster, it is advantageous to provide a compact hydraulic brake booster for easier installation and maintenance. However, the compact booster must include a secondary pressure source for assisting brake application when the main pressure source is rendered inoperative.

SUMMARY OF THE INVENTION

The present invention provides a hydraulic brake booster in which a piston defines a storage chamber for communicating pressurized fluid therein with the pressure chamber to assist in effecting a brake application during failure of the primary pressure source. The storage chamber is charged with pressurized fluid during normal brake applications.

In particular, a brake booster housing defines a pressure chamber and slidably carries a spool valve and a piston. An operator-controlled actuating means is responsive to brake pedal movement to actuate the spool valve for communicating the pressure chamber with a pressure source so that increasing pressure in the pressure chamber moves the piston to actuate a master cylinder for actuating braking. A check valve in the piston communicates the increasing pressure in the pressure chamber with the storage chamber and retains the pressurized fluid in the storage chamber when the pressure in the pressure chamber decreases following a brake application.

When the pressure source is disabled, the operator-controlled actuating means cooperates with the spool valve to close the pressure chamber and, subsequently, cooperates with the check valve to release the pressure in the storage chamber into the pressure chamber for urging the piston in a direction actuating the master cylinder.

As the piston in a hydraulic brake booster is required in order to actuate the brake master cylinder, the provision of a storage chamber within the piston to form an accumulator optimizes the compactness of the brake booster. Therefore, installation is simplified due to the size of the unit and the unit is compatible with the smaller engine compartments resulting from smaller motor vehicles.

DETAILED DESCRIPTION

Figure 1:
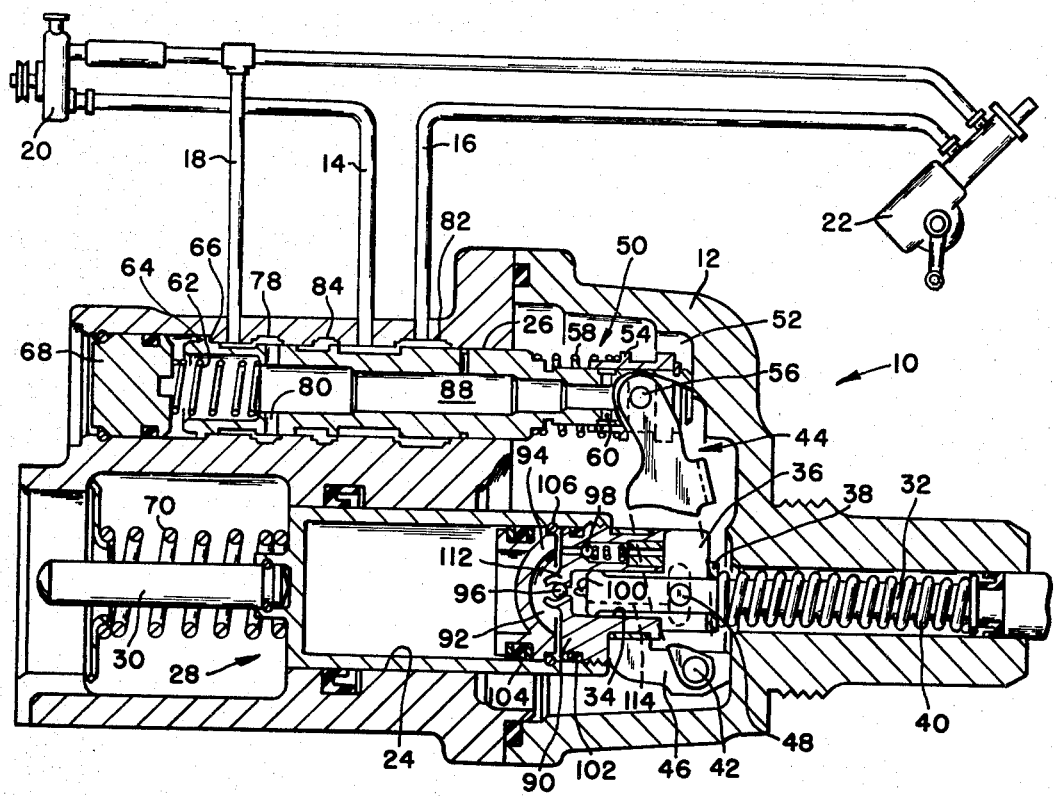
FIG. 1 is a schematic illustration of a vehicle hydraulic system with a hydraulic brake booster of the present invention, shown in cross section.

Referring now to the drawings, the brake booster generally indicated by the numeral 10 includes a housing 12 having an inlet port 14, an outlet port 16, and a return or exhaust port 18. The inlet port 14 is communicated to the outlet or high pressure side of the vehicle power steering pump 20, and the outlet port 16 is communicated to the inlet of the vehicle power steering gear 22. The exhaust port 18 and the outlet of the gear 22 are each connected to a reservoir (not shown) at the inlet or low pressure side of the pump 20.

The housing 12 defines first and second bores 24 and 26 therewithin. A piston 28 is slidably mounted in the bore 24 and is provided with a connecting rod 30 which transmits movement of the piston 28 to a conventional automotive master cylinder (not shown) which is mounted just to the left of the housing 12, viewing FIG. 1. Of course, movement of the piston 28 to the left generates pressure in the aforementioned master cylinder in the conventional manner. One end of another rod 32 is slidably received in a bore 34 in the piston 28, and the opposite end of the rod 32 is connected to a conventional brake pedal (not shown) mounted in the vehicle operator's compartment. A bracket 36 is slidably mounted on the rod 32 and is urged into engagement with a stop ring 38 by a spring 40. A first pivot 42 connects one end of lever means 44 to a bracket 46 which is integral with the piston 28, and a second pivot 48 connects the intermediate portion of the lever means 44 with the bracket 36.

A spool valve generally indicated by the numeral 50 is slidably mounted in the bore 26 and is adapted to control fluid communication into the booster pressure chamber 52. A secondary valve 54 is slidably mounted on the end of the spool valve 56 extending into the pressure chamber 52, and a third pivot 56 connects the lever means 44 with the secondary valve 54. A spring 58 yieldably urges the secondary valve 54 away from openings 60 in the body of the spool valve 50. Another spring 62 yieldably urges the spool valve 50 into a first or brake-released position defined by the engagement of a stop 64 carried on the spool valve 50 with a shoulder 66 provided on the wall of the bore 26. The second or brake fully applied position of the spool valve 50 is defined by the engagement of the left hand end of the spool valve 50 with a plug 68 which closes the bore 26.

The spool valve 50 and housing bore 26 include cooperating lands and grooves such that in the first position, illustrated in FIG. 1, the pressure chamber 52 is vented via openings 60, passage 88 and openings 80 to the exhaust port 18. As the spool valve 50 moves to the second position with the left end of spool valve 50 abutting plug 68, the pressure chamber 52 is communicated via openings 60, passage 88 and openings 80 to the inlet port 14.

Figure 2:
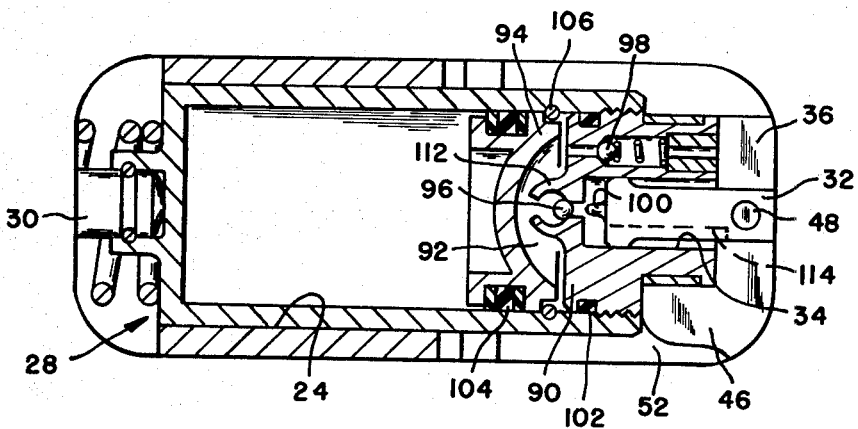
FIG. 2 is an enlarged fragmentary cross-sectional view of the piston used in the hydraulic brake booster illustrated in FIG. 1.

The piston 28, as illustrated more clearly in FIG. 2, includes a plug 90 threadably engaging an open end of the piston. The plug and piston cooperate to form a storage chamber 92 located internally of the piston. A diaphragm 90 slidingly engages the inner wall of the storge chamber 92, and is biased to the right viewing the Figures by a compressible gas medium on the left side of the diaphragm, to pressurize the fluid content of the storage chamber.

The plug 90 defines the bore 34 which slidingly receives the rod 32. The rod 32 is slotted at 114 to allow fluid communication between the rod 32 and bore 34. A check valve 96 is centrally disposed in the plug cooperates with bore 34 to define a passage communicating the storage chamber 92 with the pressure chamber 52 when the pressure in the pressure chamber is larger than the pressure in the storage chamber. A boss 112 on the inside of plug 90 is staked at its opening to retain the ball check valve 96 within the plug. The plug 90 also carries a pressure relief valve 98 opening communication between the storage chamber and the pressure chamber when the pressure in the storage chamber is above a predetermined valve. This relief valve prevents buildup of fluid pressure in the storage chamber above that which is suitable for actuating braking. Communication between the storage and pressure chambers is also established, when the pressure in the pressure chamber is below that in the storage chamber during a brake actuation, by means of a projection 100 on the rod 32, which projection engages the check valve to unseat the ball of the check valve 96.

Seal means 102 and 104 are carried within recesses on the plug and diaphragm, respectively, to seal the plug and piston and to slidingly seal the diaphragm to the inner wall of the storage chamber.

A snap ring 106 retains the diaphragm within the storage chamber and is mounted in a recess on the inner wall of the storage chamber.

MODE OF OPERATION

When the operator presses on the brake pedal, the rod 32 moves to the left viewing FIGS. 1a and 2, thereby pivoting lever 44 about pivot 42 to move the spool valve 50 to the left in the second position. In this position the spool valve 50 communicates the inlet port 14 with the pressure chamber 52. Increasing pressures in the pressure chamber from the inlet port communicate with the storage chamber 92 via bore 34 and check valve 96, while also urging the piston 28 to the left to engage the connecting rod with a master cylinder for actuating braking.

If the pressure source 20 is disconnected from the hydraulic brake booster 10 or disabled, no pressure is communicated to the pressure chamber 52. Moreover, no pressure is communicated to the pressure chamber 52 when the spool valve sticks. Consequently, when the operator steps on the brake pedal to shift the spool valve to the second position no movement of the piston occurs. In accordance with the invention, further movement of the rod 32 pivots the lever 44 to move the valve 54 to the left on the spool valve 50 to close oenings 60, whereupon projection 100 on the rod 32 engages check valve 96 to communicate the storage chamber 92 on the right side of diaphragm 94 with the pressure chamber 52. This communication increases the pressure in the pressure chamber 52 to urge piston 28 to the left thereby actuating braking.

With the pressure source disabled or disconnected from the hydraulic brake booster, several brake applications by the operator will exhaust the pressurized fluid contained in the storage chamber. Thereafter, brake actuation proceeds as follows. Stepping on the brake pedal moves the rod 32 to the left to engage projection 100 with check valve 96. Because the pressurized fluid is spent in preceding brake applications, no increasing pressures are communicated to the pressure chamber. Consequently, further rod movement is required to actuate braking. Such further movement pivots lever 44 about pivot 56 on spool valve 50 to move bracket 46 to the left. Since bracket 46 is integral with piston 28, movement of the bracket moves the piston to operate the master cylinder for actuating braking.

The last-mentioned braking application, which proceeds without a pressure source or a stored pressurized fluid in the storage chamber, results in a manual brake application as the rod 32 mechanically urges the rod 30 in a direction actuating the master cylinder.

Thus it is apparent from the aforementioned description that the present invention provides a compact hydraulic brake booster with a piston defining an accumulator which permits at least one safety braking application after a pressure source for the booster has been disconnected. Thereafter, with the pressure source disconnected, the operator manually actuates braking.

While the invention has been described in conjunction with a specific embodiment thereof, it is evident that many alternatives, modifications, and variations are included within the broad scope of the appended claims.

I claim:

1. A hydraulic brake booster comprising:
    a housing defining a pressure chamber;
    spool valve means cooperating with said housing to vent the pressure chamber when said spool valve means is in a first position and communicate the pressure chamber to a pressure source as said spool valve means moves to a second position;
    a piston slidably mounted in said housing;
    said piston being responsive to pressure within said pressure chamber to move relative to the housing to actuate braking;
    said piston defining and enclosing a storage chamber which is located internally of said piston and said housing;
    check valve means communicating the pressure chamber with the storage chamber when the pressure in the pressure chamber is above that in the storage chamber; and
    operator actuating means engaging the spool valve means to move the same from said first position to said second position;
    said operator actuating means cooperating with the spool valve means in the second position to close communication between the pressure source and pressure chamber;
    said operator actuating means also cooperating with said check valve means to open communication between the storage chamber and pressure chamber after said operator actuating means moves the spool valve to the second position and cooperates with the spool valve to close communication between the pressure source and pressure chamber.

2. The hydraulic brake booster of claim 1 in which said piston forms an opening at one end and includes a plug fixedly engaging said end opening and separating the pressure chamber from said source chamber, said plug forming a passage communicating the pressure chamber with the storage chamber and said check valve means being disposed in the passage.

3. A hydraulic brake booster comprising:

a housing defining a pressure chamber and having a bore leading to the pressure chamber;

a piston slidably disposed in said housing bore;

said piston being responsive to pressure in the pressure chamber to move relative to the housing to actuate braking;

said piston defining and enclosing a storage chamber which is completely located internally of said piston and said housing; and said piston carrying valve means to permit communication of pressurized fluid from the pressure chamber to said storage chamber when the fluid pressure level in said storage chamber is substantially less than the fluid pressure level in the pressure chamber, said storage chamber normally storing pressurized fluid therein separate from the pressure chamber when the fluid pressure within the pressure chamber is sufficient to move said piston during braking, and said storage chamber being movable within said housing bore together with said piston;

operator actuating means cooperating with said valve means to open communication between the storage chamber and the pressure chamber when the pressure in the pressure chamber is below that required to move said piston relative to the housing when a brake application is effected.

4. A hydraulic brake booster comprising:

a housing defining a pressure chamber;

spool valve means cooperating with said housing to vent the pressure chamber when said spool valve means is in a first position and communicate the pressure chamber to a pressure source as said spool valve means moves to a second position;

a piston slidably mounted in said housing;

said piston being responsive to pressure within said pressure chamber to move relative to the housing to actuate braking;

said piston defining and enclosing a storage chamber which is located internally of said piston and said housing;

check valve means communicating the pressure chamber with the storage chamber when the pressure in the pressure chamber is above that in the storage chamber; and operator actuating means engaging the spool valve means to move the same from said first position to said second position;

said operator actuating means cooperating with the spool valve means in the second position to close communication between the pressure source and pressure chamber;

said operator actuating means also cooperating with said check valve means to open communication between the storage chamber and pressure chamber after said operator actuating means moves the spool valve to the second position and cooperates with the spool valve to close communication between the pressure source and the pressure chamber;

said piston and said spool valve means being slidably mounted in separate bores on said housing, said piston including a plug forming a portion of said storage chamber and separating the pressure chamber from said storage chamber, said plug forming a passage communicating the pressure chamber with the storage chamber, said check valve being disposed within the passage; and said operator actuating means including a portion extending into the passage and said portion being engageable with said check valve means, said operator actuating means portion including slots cooperating with the passage to communicate the pressure chamber with the storage chamber.

5. In a hydraulic brake booster for a vehicle having a fluid pressure source, a housing defining a pressure chamber, a control valve movable relative to the housing to communicate fluid pressure from the fluid pressure source to the pressure chamber during a brake application, and a piston movably disposed within a bore in the housing, the piston being completely enclosed within the housing and moving in response to pressurized fluid within the pressure chamber to actuate braking for the vehicle, the improvement wherein the piston defines a storage chamber which is completely enclosed within the piston, the piston carrying valve means permitting fluid communication from the pressure chamber to said storage chamber to receive fluid pressure in the latter when the fluid pressure in the pressure chamber is greater than in said storage chamber, said storage chamber normally storing the fluid pressure separate from the pressure chamber during braking and communicating fluid pressure from said storage chamber to the pressure chamber only when the fluid pressure within the latter is insufficient to move the piston, and the piston and said storage chamber being movable together within the housing bore in response to fluid pressure within the pressure chamber.

6. In a hydraulic brake booster for a vehicle having a fluid pressure source, a housing defining a pressure chamber and movably supporting a control valve which is operable during a brake application to communicate fluid pressure from the fluid pressure source to the pressure chamber, a piston movable relative to the housing in response to pressurized fluid within the pressure chamber, the piston carrying valve means exposed to the pressure chamber, and an accumulator cooperating with the valve means to communicate pressurized fluid stored within the accumulator to the pressure chamber via the valve means when the piston fails to move in response to fluid pressure within the pressure chamber during a brake application, the accumulator being defined by and completely enclosed within the piston to compactly dispose the accumulator within the hydraulic brake booster, and also to move the accumulator with the piston during the brake application, and the accumulator receiving fluid pressure from the pressure chamber via the valve means to normally store fluid pressure therein during the brake application.

* * * * *